United States Patent
Maier

(10) Patent No.: US 9,895,827 B2
(45) Date of Patent: Feb. 20, 2018

(54) METHOD AND MANUFACTURING SYSTEM FOR PRODUCING PREFABRICATED PARTS FROM MINERAL-BOUND BUILDING MATERIALS

(71) Applicant: Christoph Maier, Buchloe (DE)

(72) Inventor: Christoph Maier, Buchloe (DE)

(*) Notice: Subject to any disclaimer, the term of this patent is extended or adjusted under 35 U.S.C. 154(b) by 768 days.

(21) Appl. No.: 14/038,326

(22) Filed: Sep. 26, 2013

(65) Prior Publication Data

US 2014/0027949 A1 Jan. 30, 2014

Related U.S. Application Data

(63) Continuation of application No. PCT/DE2012/000337, filed on Mar. 30, 2012.

(30) Foreign Application Priority Data

Mar. 30, 2011 (DE) .................. 10 2011 015 600

(51) Int. Cl.
  *B29C 33/34* (2006.01)
  *B28B 7/08* (2006.01)
  (Continued)

(52) U.S. Cl.
  CPC .............. *B29C 33/34* (2013.01); *B28B 7/082* (2013.01); *B28B 15/002* (2013.01);
  (Continued)

(58) Field of Classification Search
  CPC ....... B29C 33/34; B29D 99/001; E04G 11/32; E04G 21/16; B28B 7/082; B28B 15/002
  (Continued)

(56) References Cited

U.S. PATENT DOCUMENTS 2,717,801 A * 9/1955 Neil .................. E04G 21/16
  212/234
2,828,870 A * 4/1958 Corley .................. B66C 7/00
  182/141
(Continued)

FOREIGN PATENT DOCUMENTS

CN    1297505      5/2001
CN    101460267    6/2009
(Continued)

OTHER PUBLICATIONS

PCT Search Report filed in counterpart application No. PCT/DE2012?000337, dated Oct. 25, 2012, 13 pages including translation.

(Continued)

*Primary Examiner* — Nahida Sultana
(74) *Attorney, Agent, or Firm* — Blank Rome LLP

(57) ABSTRACT

A method and manufacturing system for producing prefabricated parts of mineral-bound building materials, in particular for construction of buildings is disclosed. The manufacturing system includes at least one formwork table provided for casting the prefabricated parts of mineral-bound building materials as the essential component. The manufacturing system is mobile and it can be brought to the site of use of the prefabricated parts and in particular to the erection site of a building for manufacturing the prefabricated parts. Thus, this mobility allows transporting a complete small factory for manufacturing prefabricated parts of mineral-bound building materials to very different locations.

19 Claims, 9 Drawing Sheets

(51) Int. Cl.
*B28B 15/00* (2006.01)
*E04G 11/32* (2006.01)
*E04G 21/16* (2006.01)
*B29D 99/00* (2010.01)

(52) U.S. Cl.
CPC ............ *B29D 99/001* (2013.01); *E04G 11/32* (2013.01); *E04G 21/16* (2013.01)

(58) Field of Classification Search
USPC ........... 425/470, 62; 264/299, 333; 249/120, 249/137, 139, 161, 170
See application file for complete search history.

(56) References Cited

U.S. PATENT DOCUMENTS

| | | | | |
|---|---|---|---|---|
| 3,824,958 A | * | 7/1974 | Parady, Jr. | ............ A01K 1/0272 119/410 |
| 3,891,102 A | * | 6/1975 | Blount | ................. B60P 1/4421 211/118 |
| 4,077,757 A | * | 3/1978 | DeCoster | ................ B28B 1/093 249/137 |
| 4,206,163 A | * | 6/1980 | DeCoster | ................ B28B 7/082 264/256 |
| 4,207,042 A | | 6/1980 | Linetsky | |
| 4,244,682 A | * | 1/1981 | Willingham | .......... B28B 15/002 249/161 |
| 4,722,655 A | * | 2/1988 | Bonerb | .................... B60P 1/56 105/243 |
| 4,801,229 A | * | 1/1989 | Hanada | .................... B60P 3/08 410/26 |
| 2003/0234339 A1 | | 12/2003 | Heide | |
| 2007/0012534 A1 | * | 1/2007 | Murphy | ................ B62D 21/20 188/377 |
| 2014/0369801 A1 | * | 12/2014 | Beauchamp | .......... B62B 5/0003 414/800 |

FOREIGN PATENT DOCUMENTS

| | | |
|---|---|---|
| DE | 2034205 | 2/1971 |
| DE | 2154956 | 5/1973 |
| DE | 102006051045 | 5/2008 |
| EP | 1881130 | 1/2008 |
| WO | WO01/29337 | 4/2001 |
| WO | WO2008/104166 | 9/2008 |

OTHER PUBLICATIONS

German Office Action filed in counterpart application No. 102011015600.3, dated May 9, 2012, 5 pages.

Chinese Office Action Office Action filed in counterpart application No. 201280016683.9, dated Feb. 28, 2015, 11 pages.

* cited by examiner

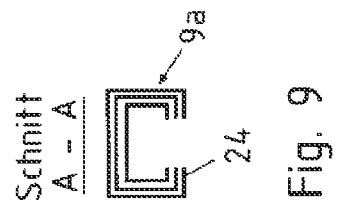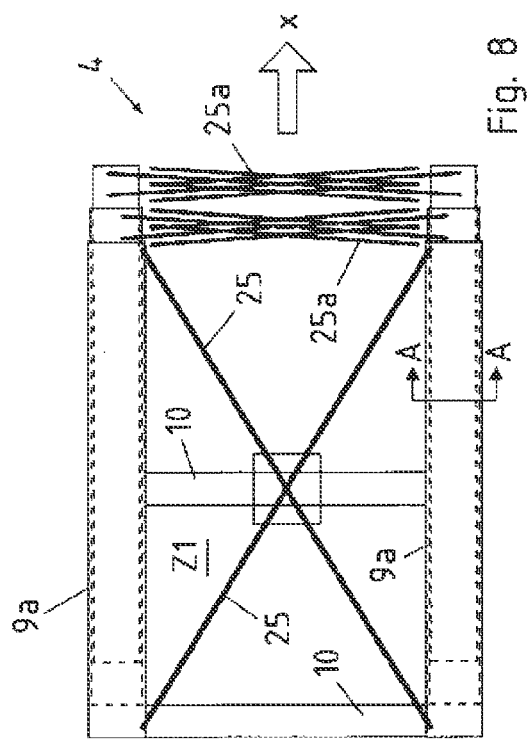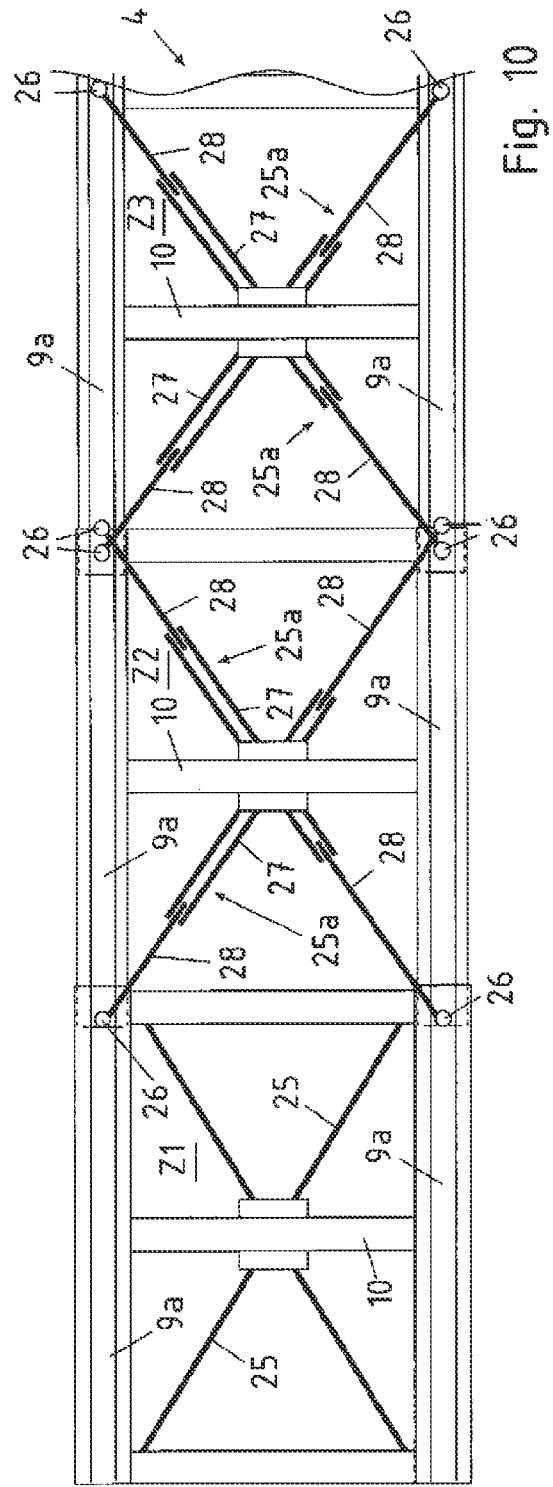

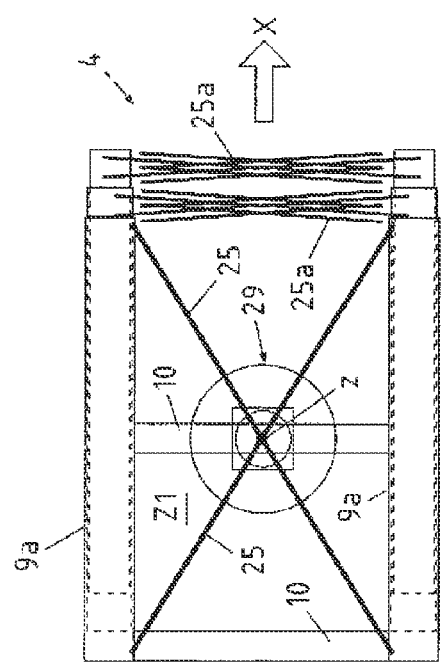
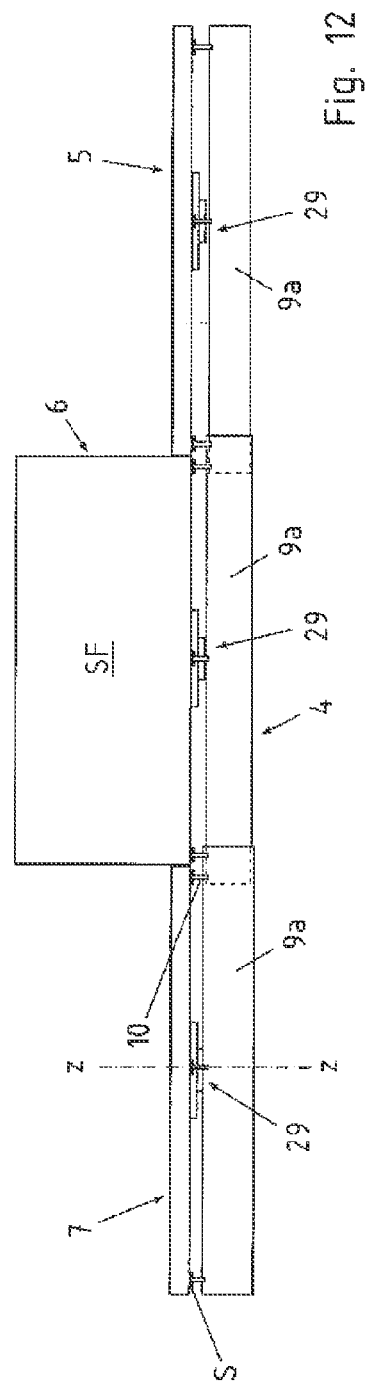

METHOD AND MANUFACTURING SYSTEM FOR PRODUCING PREFABRICATED PARTS FROM MINERAL-BOUND BUILDING MATERIALS

FIELD OF THE INVENTION

The invention relates to a method for producing prefabricated parts of mineral-bound building materials.

In particular the construction of buildings requires high effort of personnel, time and transport logistics. By the prefabricated house construction, this effort can be reduced.

BACKGROUND ART

There are various methods of producing prefabricated houses:

One possibility is in causing an enterprise to build a so-called turnkey house. Usually, the structural work of a turnkey house stands after ca. 6 weeks.

A further possibility is in obtaining prefabricated parts from a distributor and self undertaking the construction of the walls, floors and ceilings. In structurally weak areas, usually, very long transportation routes are to be covered since the factory, in which the prefabricated parts are produced, is mostly located in areas with optimum infrastructure for the factory manufacture, thus is usually located far away. Despite of the advantages of the prefabricated construction, this technology is only rarely employed due to the above described disadvantages.

In both possibilities, one hands over the manufacture of the prefabricated parts for manufacturing and logistical reasons.

The production of prefabricated parts usually occurs in factories, from which the prefabricated parts or the complete prefabricated houses are then transported to a desired erection site. Especially with greater building projects or projects with time pressure, e.g. after natural disasters, long construction times or long transportation routes are unacceptable. Here, remedy is to be provided.

Therefore, the invention is based on the object of disclosing a method for producing prefabricated parts of mineral-bound building materials, which allows producing different prefabricated parts, in particular walls, floors and ceilings, or complete buildings near the site of use of the prefabricated parts. Further, a manufacturing system is to be disclosed, which allows producing prefabricated parts of mineral-bound building materials near the site of use of the prefabricated parts.

SUMMARY OF THE INVENTION

In a method for producing prefabricated parts of mineral-bound building materials, in particular for construction of buildings, by means of a manufacturing system, the used manufacturing system includes at least one formwork table provided for casting the prefabricated parts of mineral-bound building materials as the essential component. The manufacturing system is mobile and it can be brought to the site of use of the prefabricated parts and in particular to the erection site of a building for manufacturing the prefabricated parts. Thus, this mobility allows transporting a complete small factory for manufacturing prefabricated parts of mineral-bound building materials to very different locations.

The required binders, aggregates as well as mixing water and possible additives for producing mineral-bound building materials can be easier transported than bulky prefabricated parts already produced from them, which often have a considerable weight due to their size. The transport logistics are much simpler since only building materials or the raw materials thereof as well as materials have to be made available on site, which usually can be provided on shorter transportation routes.

With the method the following prefabricated parts can be produced:

Wall, ceiling, floor, basement or stone elements, front elements, plaster plates, insulating elements or fence elements.

On site, in particular prefabricated parts with very different densities can be produced, e.g. of concrete and of a much lighter insulating material.

In some embodiments, the entire manufacturing system can fit in a cargo container, which can be transported to the erection site by means of a truck. The cargo container can be transported by air, by water or by land without problem. Thus, the manufacturing system can be transported to each location, to which a road leads.

Furthermore, it is provided that the formwork table is brought into a horizontal position for casting the prefabricated parts and is inclined about a horizontal axis for or after forming. In the horizontal position, a mixture of a mineral building material is placed in the formwork. In this position, the mineral building material can be flatly moved off. After the mineral building material is then set as far in the formwork, then it can be stripped. For stripping wall elements, the formwork table is inclined about the horizontal axis such that the dried prefabricated parts can be removed.

Advantageously, several formwork tables are provided, which can be displaced independently of each other. This entails the advantage that several prefabricated parts can be produced independently of each other at the same time. While a wet mixture of a mineral building material still sets on one formwork table, the already set prefabricated part can be removed on another formwork table. At the same time, a new mixture of a mineral building material can be cast in a third formwork of a further formwork table. In addition, it is advantageous that differently configured prefabricated parts can be manufactured at the same time. Floors, ceilings and walls can be provided with variable recesses for doors and windows. This allows the utilization of established standard shapes or else the realization of individual ideas. This means that for example a wall can be cast on one formwork table and another part can be cast on a second formwork table.

Preferably, the formwork table is inclined into its respectively required position via compressive force. Therein, the compressive force is advantageously introduced into the formwork table by means of a linear drive. The compressive force is introduced from a bottom of the formwork table opposing the formwork area. To this, the linear drive is mounted below the formwork table, wherein it extends between the formwork table and the respective ground or a corresponding substructure, for example a supporting structure.

In order to achieve displacement as well as inclination of the formwork table, which behaves as stable as possible as well as is balanced and associated with little distortions, it is provided that the compressive force is introduced in the region of the center of area of the formwork table.

With respect to a tensile force introduced for inclining the formwork table, the compressive force generated via the linear drive can provide increased safety. Thus, tensile forces are transmitted by corresponding pull means such as for example ropes or chains, the failure of which results in mostly abrupt tilting of the formwork table. The danger to the operating personnel arising from it as well as the possible damage to the system is avoided according to the invention in that the used linear drive has a protection against return. This return protection can already be present by construction if for example a self-locking spindle or rack drive is used.

Preferably, the linear drive is hydraulically driven. Preferably, it is a single-acting or double-acting lifting cylinder. Oil, water or an oil-water emulsion can be employed as the fluid for the hydraulic drive.

Advantageously, the hydraulic drive has or is coupled to a safety element. The safety element is provided for effectively preventing undesired lowering of the formwork table inclined out of its horizontal position and thus erected. For example, the safety element can be a check valve. In addition, pressure limiting valves can be provided, which protect from overpressure.

The actuating force required for actuating the linear drive can be effected both with muscle power and from a suitable drive. For increasing the actuating force, suitable force boosters, i.e. transmissions or also pressure boosters, are provided, which are coupled to a pump. Of course, the pump can also be operated by means of muscle power. Furthermore, the pump can also be operated by motor, for example via an electric motor or an internal combustion engine. The connection of the linear drive to an external hydraulic or pneumatic source for example of a motor vehicle (tractor, Unimog, truck) is also conceivable.

Preferably, each individual formwork table has two horizontal axes spaced parallel to each other. The individual formwork tables can each be inclined in respectively equal or mutually different directions about one of these axes. The advantage is that several prefabricated parts can be created in parallel in a manufacturing system with several formwork tables, which can be inclined towards the respectively required side and thus be erected on demand.

Thus, it can for example be advantageous that the side of the prefabricated part facing the respective formwork area of the formwork tables constitutes the exterior visible side of wall elements. In order not to have to rotate the prefabricated parts before their erection on the intended site in expensive manner, they can be suitably erected already by the choice of the inclination direction of the formwork table.

In particular, the formwork tables are movable. Preferably, they are supported on a supporting structure, which is displaced on rails out of the cargo container and into it upon non-use. The displacement can be effected on a railbound or non-railbound system. The formwork tables can be displaced and in particular moved into the cargo container upon non-use, after completed work, for protection from adverse weather or also for protection from theft.

It is possible that the end of the linear drive can be displaced analogously to the respective inclination direction of the formwork table. Preferably, the end of the linear drive facing away from the formwork table is detachably coupled to the supporting structure. For example, the coupling can be effected by detachably bolting. To this, the supporting structure has at least two mutually opposing receptacles, wherein the said end of the linear drive is selectively coupled to the one or the other receptacle.

Advantageously, the linear drive is coupled to that receptacle of the supporting structure opposing the horizontal axis, about which the formwork table is to be inclined.

The formwork table can have a chassis. By the chassis, the formwork table can be autonomously moved. Of course, the chassis can also be disposed on the supporting structure, on which several formwork tables are supported. The formwork table can be moved between its possible operating sites by the supporting structure. In the same manner, several formwork tables disposed on the supporting structure can thus also be collectively moved between their operating sites if the chassis is disposed on the supporting structure.

According to the configuration of the chassis, thus, operating sites difficult to access can also be reached, which are located on unfortified terrain. Apart from moving between possible operating sites for producing the prefabricated parts, thus, already produced or prefabricated parts still located in the formwork can also be brought to the site of their installation or their erection. This is in particular advantageous if suitable hoist with sufficient operating range is not present or employable on site in order to displace the prefabricated parts far enough.

In an advantageous development, the supporting structure supporting the formwork table(s) is formed such that it can be transferred from a transport size into an operating size by pulling apart. In other words, the supporting structure is thus varied in its dimensions, wherein it is pushed together as space saving as possible upon its stay within the cargo container, while it is pulled apart to its full or currently required size outside of the cargo container. In this manner, the supporting structure is extended or contracted. To this, the supporting structure is composed of individual elements coupled to each other via hinge connections.

In contrast to the production of prefabricated parts in closed buildings, the displacement of the formwork tables out of the cargo container offers the possibility of utilizing solar and wind energy for drying the prefabricated parts. The natural heat supply has positive ecological and economic effects.

The formwork tables can have hinges allowing unfolding of the formwork tables to a width in a use position, which exceeds the width of the cargo container. The capability of unfolding the formwork tables allows producing larger prefabricated parts. Moreover, there is the possibility of creating a large common area from the individual formwork tables, which allows high variance with respect to the size of the prefabricated parts. With the method, the possibility of creating single-floor bungalows as well as multi-level buildings, e.g. single- and multi-family houses, school buildings, hospitals or other public institutions, is given. Of course, prefabricated parts for open structures such as e.g. fences can also be produced.

Another possibility for enlarging the formwork tables is given via external modules, by which a use position is also allowed, which exceeds the width of the cargo container. For example, the external modules can be screwed to and/or pushed onto or into the formwork tables.

Preferably, the formwork tables are designed or extendable to a formwork area of at least 2.5 m×2.5 m to 5.0 m×5.0 m. In particular with a succession of several formwork tables, they can allow an overall formwork area of 5.0 m×10.0 m to 5.0 m×50.0 m. In the latter case, the supporting structure is extendable such that 10 of the formwork tables having the raster of 5.0 m×5.0 m in total can be supported thereon.

By connecting the individual linear drives to each other, the successive formwork tables can be inclined to the same direction at the same time in order to thus also allow stripping large prefabricated parts by erecting them.

Of course, herein, individual formwork tables can also be inclined in directions varying from each other or not at all. This depends on the respective dimensions of the prefabricated parts to be produced.

To this, the supporting frame is first extended to the required size and the required number of the formwork tables is supported thereon. On demand, the formwork tables are extended with respect to their respective formwork area via the previously demonstrated possibilities. Subsequently, they are coupled to the supporting frame for example via detachable bolts on one of the horizontal axes, around which the respective formwork table is to be inclined. Furthermore, the linear drives are each disposed between formwork table and supporting structure and detachably coupled to them. The required control of the linear drives is effected by their entire or partial coupling to each other.

The manufacturing system can be brought into the cargo container such that first the formwork tables are removed and folded up and/or the external modules are removed on demand. Subsequently, the supporting structure is pushed together and placed in the cargo container. Finally, the individual formwork tables are stacked on the supporting structure and the possible external modules are also brought into the cargo container.

The operation of the formwork table and the assembly of the finished prefabricated parts are simply and fast learnt. Already after relatively short instructions and short training periods, most of the works can be done autonomously by resident personnel.

Furthermore, a manufacturing system is contemplated, which serves for producing prefabricated parts of mineral-bound building materials. The manufacturing system includes at least one formwork table, which is provided for casting the prefabricated parts of mineral-bound building materials. The formwork table is supported on a supporting structure transportable to the site of use of the prefabricated parts, i.e. usually to the erection site of the building/structure to be built, together with the formwork table in a cargo container and displaceable and in particular movable out of the cargo container on site.

The manufacturing system is suitable for mineral building materials of all kinds. Advantageously, the cargo container has the customary measure of a 20 and/or 40 feet container, which can also be transported by air or by sea without problem.

The supporting structure can have rollers movable on rails. The rails are carried along in the cargo container. In at least one embodiment, it is provided that a transport path of the formwork tables of up to 40 m is allowed.

However, it is basically also conceivable to fit the formwork tables without rails/rolling system and to transport the formwork tables out of the cargo container by stacker trucks or via a hydraulic pumping system independent of current.

In a further development, the supporting frame can have a chassis, via which the supporting structure is movable together with the at least one formwork table. The rail/roller system, by which the formwork tables are movable out of the container, is not meant by this chassis. The chassis serves for the movement unlinked to rails. The chassis can for example be a wheel chassis or a caterpillar drive. The caterpillar drive as a tracked chassis entails the advantage that it is also employable on rough terrain. The chassis can be driven, for example via an electric motor or an internal combustion engine. In this manner, larger dimensioned formwork tables and thus larger prefabricated parts with corresponding weight are also movable without problem.

In an advantageous development, the supporting structure can have longitudinal supports, which are translationally mutually displaceable at least in sections both for extending and for contracting the supporting structure.

Therein, the longitudinal supports can be guided both laterally to each other and in each other. Therein, the longitudinal supports can have a laterally open or self-contained cross-section in order to allow the required length variation of the supporting structure.

In a further development, it is provided that the supporting structure includes individual struts crossing the longitudinal supports of the supporting structure. In particular in order to obtain a variable yet sufficient reinforced system in combination with the telescoping longitudinal supports, it is provided that at least some of these struts are contractible in themselves and/or extendable.

In this manner, the supporting structure can be pulled apart from a transport position into an operating position without having to detach or attach possible elements. In result, thus, an extremely fast operational readiness of the manufacturing system is achieved.

An individual frame formwork is associated with each formwork table, which allows producing formworks variable in their height and width. In addition, fixture formworks for insulations or window and door formworks (wet-on-wet methods) as well as groove formworks for laying water and electricity pipes are associated with the individual frame formworks. A very precise definition of the desired material thickness is allowed by the individual frame formwork. Moreover, a precisely defined second layer, e.g. an insulating layer, can be applied.

In the individual frame formworks, the mixture of mineral-bound building materials can also be produced directly on site. If one uses for example regional raw materials to this, thus, this entails considerable $CO_2$ saving due to the cancelled transport paths.

The formwork tables have hinges, via which they can be unfolded to a width, which considerably exceeds the width of the cargo container.

However, it is similarly possible that the enlargement of the formwork tables is effected by use of external modules, by means of which the formwork tables can be enlarged to a width, which considerably exceeds the width of the cargo container.

The formwork tables are pivoted on the supporting structure. By the capability of pivoting around a horizontal axis, various operating angles of the formwork table can be adjusted.

Swivel bearings serve for erecting the respective formwork table from its horizontal position in that the formwork table is inclinable around at least one, preferably around at least two of the swivel bearings. To this, the swivel bearings are formed and disposed such that the formwork tables are inclinable in mutually different directions by an inclination angle around at least two horizontal axes extending parallel to each other.

Therein, the possible inclination angle can be 0° to 89°.

In order to allow a comfortable and practice-oriented production as well as erection as well as stripping of the prefabricated parts as proper as possible, at least one of the formwork tables can include a pivot bearing such that the formwork table is rotatable around a rotational axis extending perpendicularly to its formwork area.

Hereby, in case of need, the entire formwork area can be rotated in its plane in order to realize a feasible orientation of the formwork table for example with respect to the local circumstances.

The formwork tables include both longitudinal profiles and transverse profiles as well as cross-profiles extending obliquely to them. These profiles constitute a substructure of the respective formwork table, on which the actual formwork area is disposed. The substructure serves for required stiffening of the formwork table, in particular the formwork area. Advantageously, the obliquely extending cross-profiles are connected to each other in a common junction. Preferably, the cross-profiles extend between the respective corner regions of the substructure towards the junction. Therein, the cross-profiles can intersect each other in the junction.

It is provided that the junction is disposed in the region of the respective center of area of the formwork tables.

By the thus provided substructure, an extremely stable frame for the actual formwork area is provided, which forms a framework due to the obliquely extending cross-profiles together with the longitudinal profiles and transverse profiles. By the force triangles resulting from it, in particular the corner regions of the formwork tables in the plane thereof and thus the planar geometry of the formwork area are formed nearly non-relocatable. Hereby, the geometry of the formwork table is conserved even after often use even in raw handling the equipment on a construction site.

In an advantageous further development it is provided that the cross-profiles each form an angle between themselves and the formwork area of the formwork tables. Thus, the cross-profiles do not extend parallel to the plane of the respective formwork area, but are disposed at an angle to it. Preferably, the angle opens towards the junction of the cross-profiles.

In this manner, the framework constituted by the substructure extends below the formwork area of the formwork table not only in the plane of the formwork area, but also perpendicular to it. In result, an extremely stiff substructure is formed, which offers torsional rigidity of the formwork area as great as possible even with high surface pressures generated by introducing the mineral building material and the prefabricated part itself.

In particular upon erecting the not yet completely set prefabricated parts by inclining the formwork table, thus, undesired deformations of the prefabricated parts can be effectively avoided, which mostly concentrate to the corner regions of the formwork table. Thus, the forces arising in the corner regions via the surface pressure are directly absorbed and divided in their components, which are effectively received and passed via the longitudinal as well as transverse profiles and in particular via the cross-profiles.

For inclining the individual formwork tables, it is provided that the inclination thereof around the respective horizontal axis is effected via an introduced compressive force. Preferably, a linear drive is provided for this. Advantageously, the linear drive is disposed between the supporting structure and the respective junction of the substructure of the formwork tables. The advantage is in the thus producible force introduction by the linear drive between two intrinsically stiff arrangements of the manufacturing system, namely the substructure and the supporting structure. Hereby, the effectiveness of the linear drive and in particular the control and exact adjustment of the required inclination angle is improved.

In particular by the coupling of the linear drive to the junction of the substructure of the individual formwork tables, central introduction of the compressive force to be applied is possible, which does without additional supports of the formwork tables. This is realized by the framework-shaped substructure of the formwork tables, which effects a pressure load distribution across the entire formwork area from the central junction. The advantage consists in a simple construction of the required lifting means in the form of the linear drive, which does without additional components.

In this context, it is provided that the linear drive is detachably coupled to the respective junction of the formwork tables and the supporting structure. In this manner, the linear drive can be relocated and also removed for bringing the manufacturing system into the cargo container without problem on demand. Thus, the linear drive can be coupled to different regions of the supporting structure according to direction and thus used horizontal axis for pivoting the formwork table in order to cause effectiveness as high as possible. To this, the supporting structure has at least two receptacles spaced from each other, via which the linear drive can be connected to the supporting structure.

In some embodiments, each one linear drive is present per formwork table.

In some embodiments, several formwork tables can be disposed on one supporting structure. Herein, it is advantageous that the respective formwork tables can occupy various operating positions at the same time.

Three formwork tables independent of each other can be disposed on a supporting structure. Thus, for example, a wet mixture of mineral-bound building materials can be placed on a first formwork table, while the mixture of mineral-bound building materials already dries on a second formwork table and at the same time the dried prefabricated part is removed on a third formwork table.

In the embodiment of several formwork tables on a supporting structure, the formwork tables are immediately adjacent. Hereby, an increased common working surface can be provided.

Preferably, a scale is disposed on the formwork tables in order to facilitate precisely setting the frame formwork.

BRIEF DESCRIPTION OF THE DRAWINGS

Below, the invention is explained in more detail based on an embodiment illustrated in the drawings. There shows:

FIG. 8 a top view or bottom view of a supporting structure in an alternative configuration;

FIG. 9 a cross-section through a region of the supporting structure of FIG. 8;

FIG. 10 the supporting structure of FIG. 8 in expanded form in the same representation;

FIG. 11 the supporting structure of FIG. 8 in a further configuration in the same representation;

FIG. 12 the manufacturing system of FIG. 11 in expanded form of the supporting structure in a side view;

FIG. 13 a front view of the manufacturing system of FIG. 12 as well as

DESCRIPTION OF EMBODIMENTS

Figure 1:
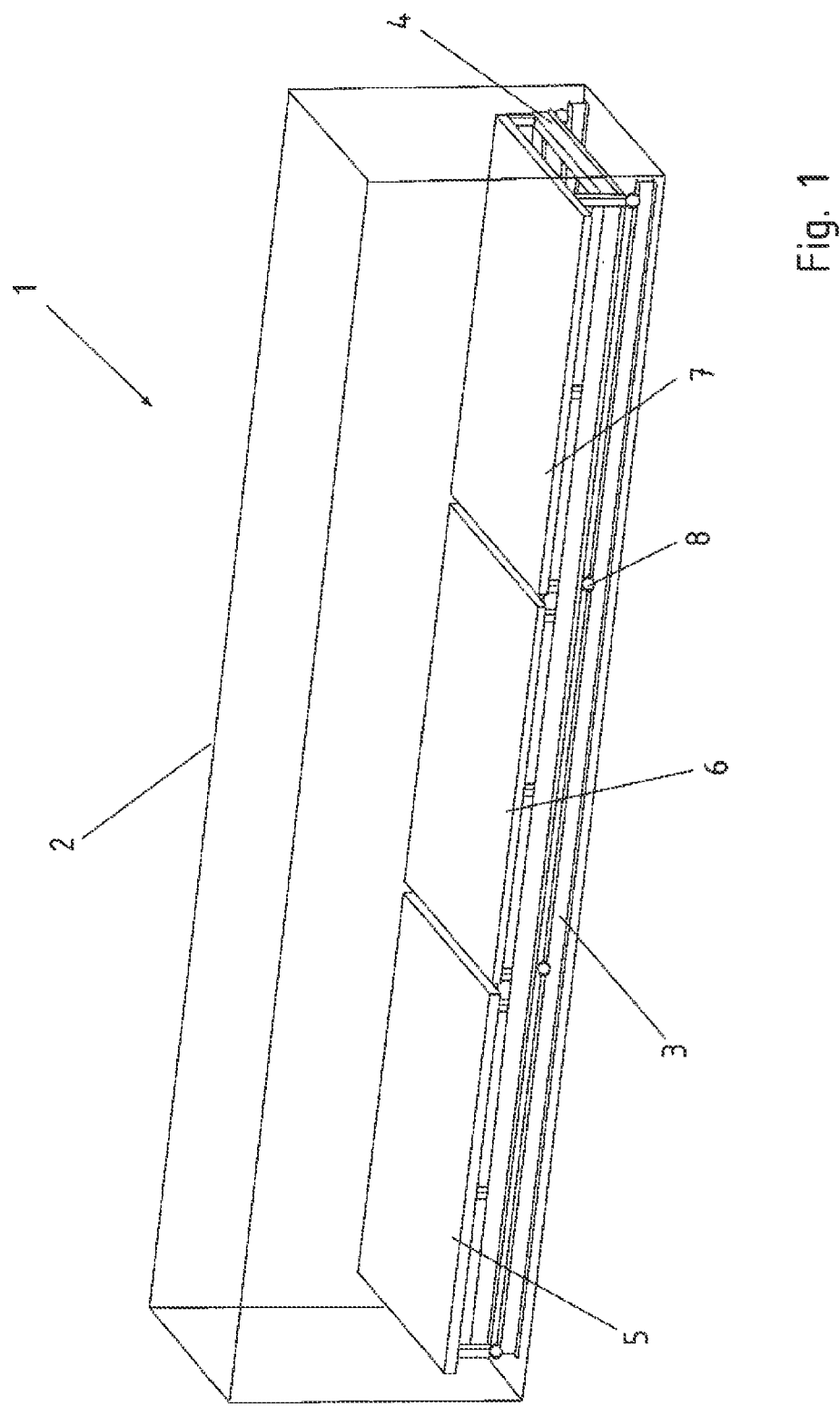
FIG. 1 a manufacturing system according to an embodiment of the invention.
Figure 3:
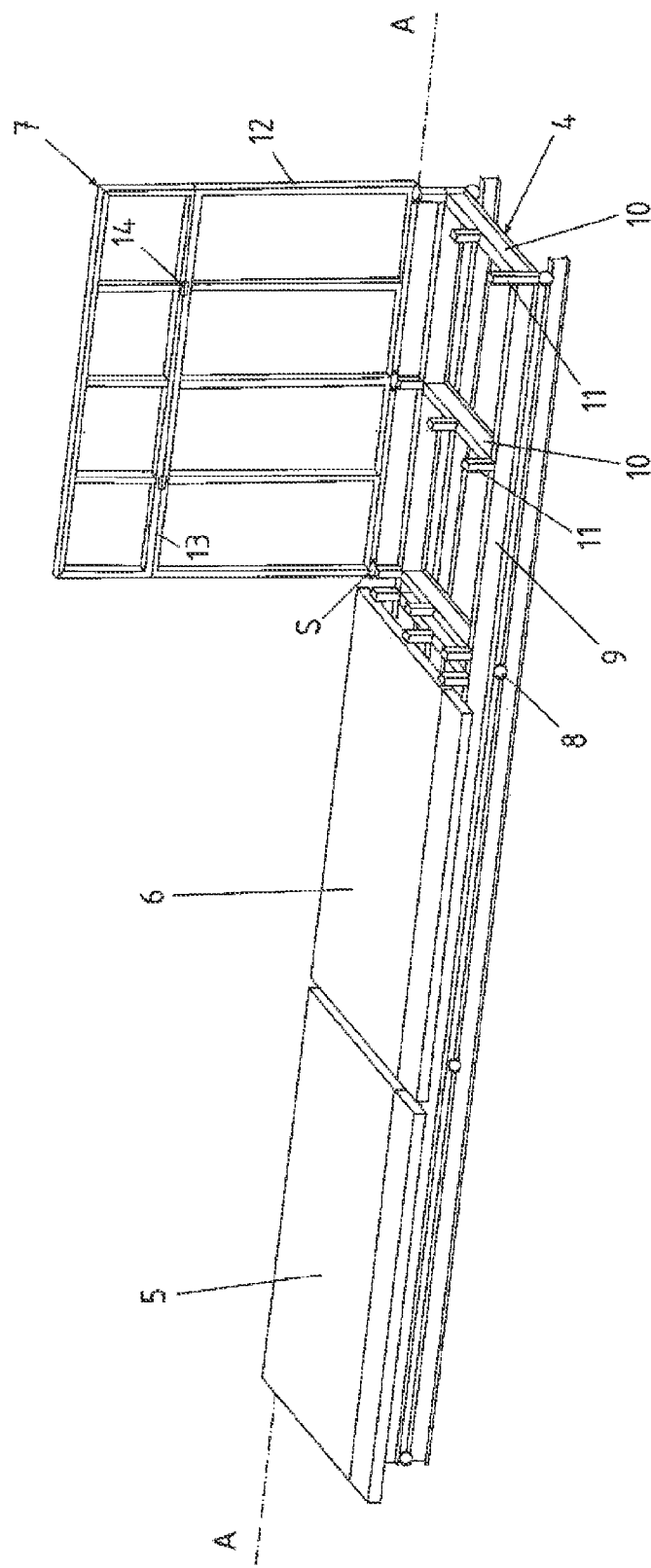
FIG. 3 the formwork tables with the supporting structure disposed on rails.

FIG. 1 shows one embodiment of a manufacturing system 1 according to the invention. It includes a conventional cargo container 2. In the cargo container 2, there are rails 3, on which a movable supporting structure 4 (FIG. 3) is supported. Three formwork tables 5, 6, 7 independent of each other are disposed on the supporting structure 4. Furthermore, rollers 8 are disposed on the supporting structure 4.

In FIG. 1, the manufacturing system 1 is not yet in the state of use. The formwork tables 5, 6, 7 are folded such that they can be stored in the cargo container 2 without problem. Up to 40 m of formwork length with a formwork width of up to 5 m can be transported in the cargo container 2. In this embodiment, the length is just 40 feet with a width of about 3 m.

Figure 2:
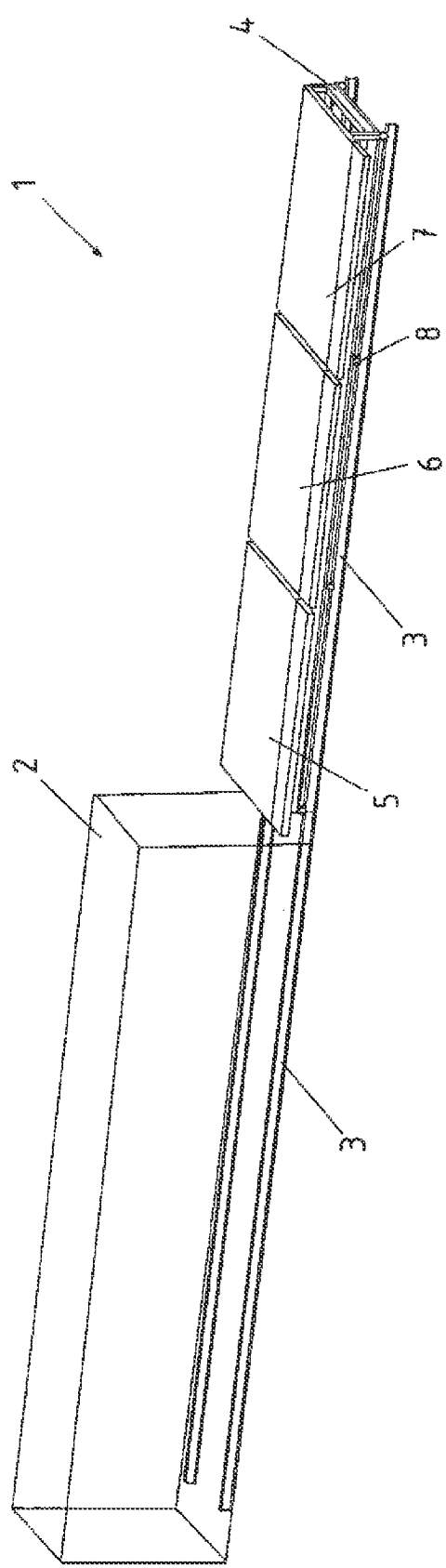
FIG. 2 a manufacturing system of FIG. 1 with formwork tables displaced out of the cargo container.

FIG. 2 shows the manufacturing system 1 of FIG. 1 with extended rails 3, on which the supporting structures 4 with the formwork tables 5, 6, 7 are displaced out of the cargo container 2. The formwork tables 5, 6, 7 are now in the unfolded state. The rails 3 can also be extended to a length of up to 40 m not shown here.

In the position displaced out of the cargo container 2, the formwork tables 5, 6, 7 can be directly taken into operation. However, the supporting structures 4 and the formwork tables 5, 6, 7 can also be operated on every other sustainable ground. For this purpose, the supporting structures 4 and/or the formwork tables 5, 6, 7 have individually adaptable adjusting spindles not shown here, which allow support also beyond the width of the supporting structure.

FIG. 3 again shows the rails 3, on which the movable supporting structure 4 is located, on which in turn the formwork tables 5, 6, 7 are pivoted. Two of the three formwork tables 5, 6 are unfolded in a horizontal position. The third formwork table 7 is inclined around a horizontal axis A. The supporting structure 4 is composed of two longitudinal supports 9 connected to each other by multiple transverse supports 10. On the transverse supports 10 and the longitudinal supports 9, there are the rollers 8 on the side facing the rails 3. On the side of the longitudinal and transverse supports 9, 10 of the supporting structure 4 facing the formwork tables 5, 6, 7, there are several legs 11 supporting the formwork tables 5, 6, 7. The formwork tables 5, 6, 7 are pivoted via swivel bearings S on each three legs located on the longitudinal supports such that they can be inclined around the horizontal axis A. The inclination angle W (FIG. 4) amounts to maximally 85°. The formwork tables 5, 6, 7 are composed of several longitudinal and transverse profiles 12, 13. The formwork tables 5, 6, 7 are illustrated in the unfolded state in FIG. 3. Differently sized prefabricated parts can be cast on the formwork tables 5, 6, 7. In the unfolded state, the respective formwork table 5, 6, 7 is enlarged by 30 to 90% with respect to its folded size, in the illustrated case by about 45%. The unfolding of the fold-out part of the formwork table 5, 6, 7 is allowed via hinges 14 disposed between the formwork tables 5, 6, 7 and the supporting structure 4. The pivoting itself is then performed via hydraulic means or crane systems not shown here. The hydraulic pressure can be established manually, electrically, per emergency power aggregate or by coupling to an external pressure source such as e.g. a truck or a construction machine.

Figure 4:
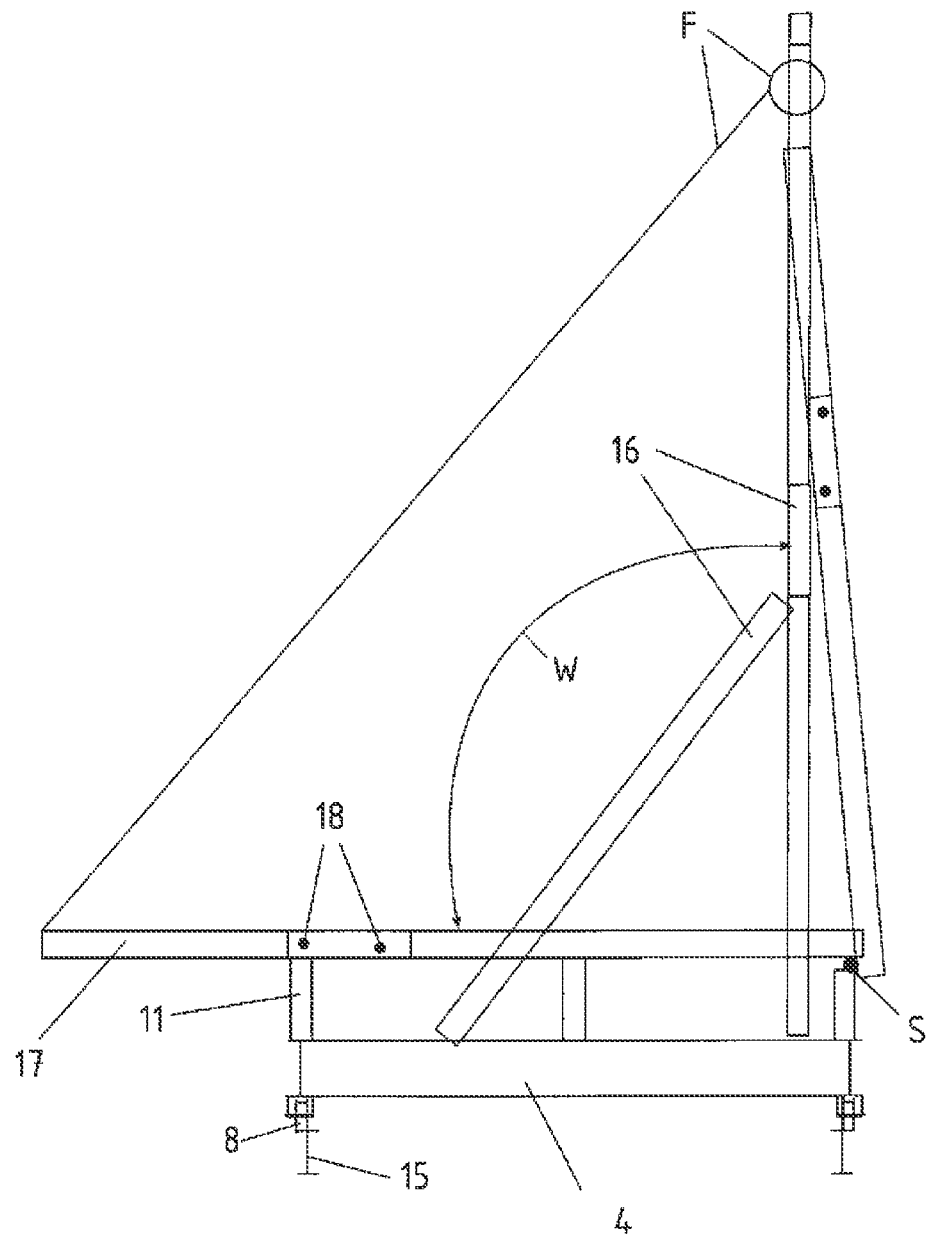
FIG. 4 a line drawing of a formwork table supported on a supporting structure.

FIG. 4 shows an illustration of the formwork table 5, 6, 7 on the supporting structure 4 in horizontal position and in erected position. Rollers 8 are disposed on the supporting structure 4, which rest on a rail profile 15. The rail profiles 15 are located bottommost in the image plane. The legs 11 supporting the formwork table 5, 6, 7 are disposed on the supporting structure 4. On the leg 11 on the right in the image plane, there is the swivel bearing S, via which the supporting structure 4 is coupled to the formwork table 5, 6, 7. The formwork table 5, 6, 7 is pivotable by an angle W along the horizontal axis A extending centrally through the swivel bearing S. The formwork table 5, 6, 7 is pivotable up to maximally 89° related to its horizontal position. On the formwork table 5, 6, 7 and the supporting structure 4, there are receiving devices for yokes 16 of steel pipes not shown here, to which a hoist F can be attached, which then presents a possibility of capability of pivoting the formwork table 5, 6, 7. In the embodiment of the formwork table 5, 6, 7 shown here, it has an external module 17 for increasing its width, which is well visible on the left in the image plane. The external module 17 is screwed to the formwork table 5, 6, 7 via screws 18.

Figure 5:
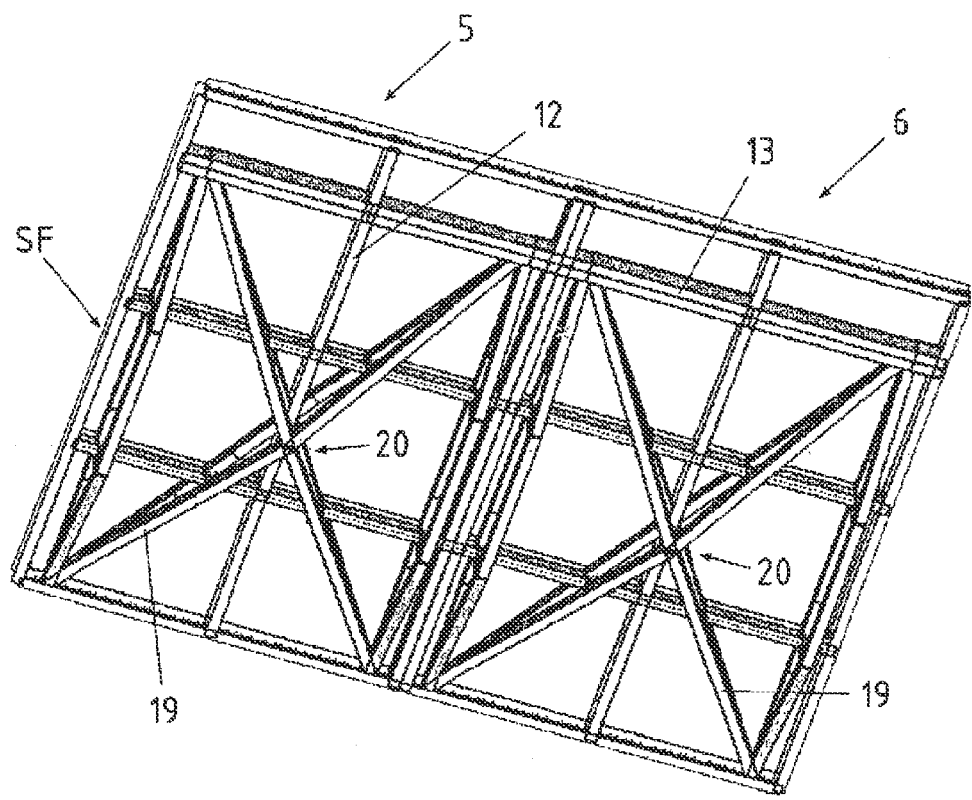
FIG. 5 a variant of formwork tables in perspective representation.

FIG. 5 shows two of the formwork tables 5, 6 in an alternative configuration. The formwork tables 5, 6 include both the longitudinal profiles 12 and the transverse profiles 13, wherein they are supplemented by cross-profiles 19 extending obliquely to them. The cross-profiles 19 are connected to each other in a common junction 20. The junction is in the region of the center of area of the respective formwork tables 5, 6.

Opposing the longitudinal and transverse profiles 12, 13 extending parallel to the respective formwork area SF of the formwork tables 5, 6, the cross-profiles 19 each form an angle between themselves and the respective formwork area SF of the formwork tables 5, 6, which opens towards the junction 20.

Figure 6:
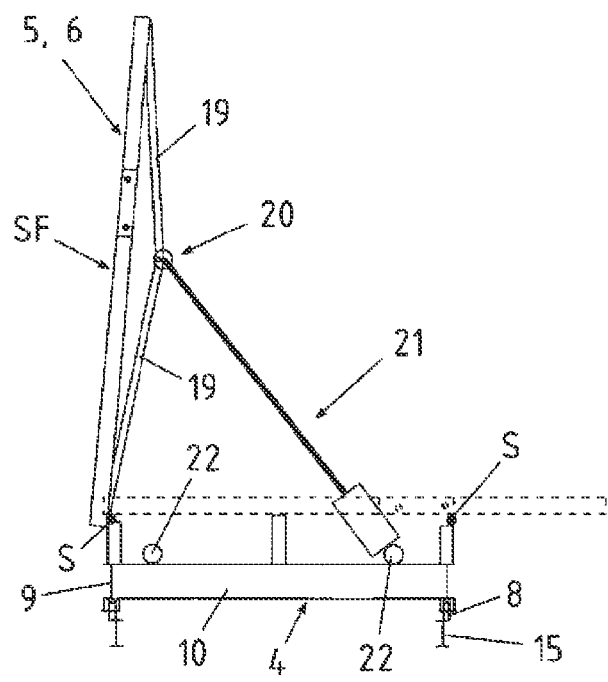
FIG. 6 a side view of one of the formwork tables of FIG. 5.

FIG. 6 schematically illustrates the construction of the alternative formwork tables 5, 6 of FIG. 5 in a side view. As is apparent, a linear drive 21 in the form of a lifting cylinder for pivoting the formwork table 5 is disposed between the supporting structure 4 and the junction 20 of the formwork table 5. Preferably, the linear drive 21 is a multi-stage lifting cylinder in order to obtain dimensions as compact as possible.

Furthermore, the supporting structure 4 has two opposing swivel bearings S such that the formwork table 5 can be inclined in different directions on demand. To this, in a manner not illustrated in more detail, the formwork table 5 is coupled to the swivel bearings S on only one of the two sides thereof via detachable bolts such that the respectively opposing swivel bearing S does not have any coupling to the formwork table 5.

The linear drive 21 is detachably coupled to the junction 20 of the formwork table 5 and the supporting structure 4. To this, in particular the supporting structure 4 has receptacles 22 spaced to each other, to which the linear drive 21 can be selectively coupled. Preferably, the receptacles 22 are formed as gimbal mount.

The selective coupling to one of the receptacles 22 depends on the direction of inclination of the formwork table 5. If inclination of the formwork table 5 occurring around the left swivel bearing S with regard to the illustration of FIG. 6 is to be effected, the linear drive 21 is coupled to the supporting structure 4 via the right receptacle 22, as illustrated. If inclination around the swivel bearing S illustrated on the right is to be effected, the linear drive 21 is coupled to the supporting structure 4 via the left receptacle 22. Theoretically, a position in the middle is also possible such that the lower end of the linear drive 21, more precisely the end coupled to the receptacle 22, does not have to be displaced.

Figure 7:
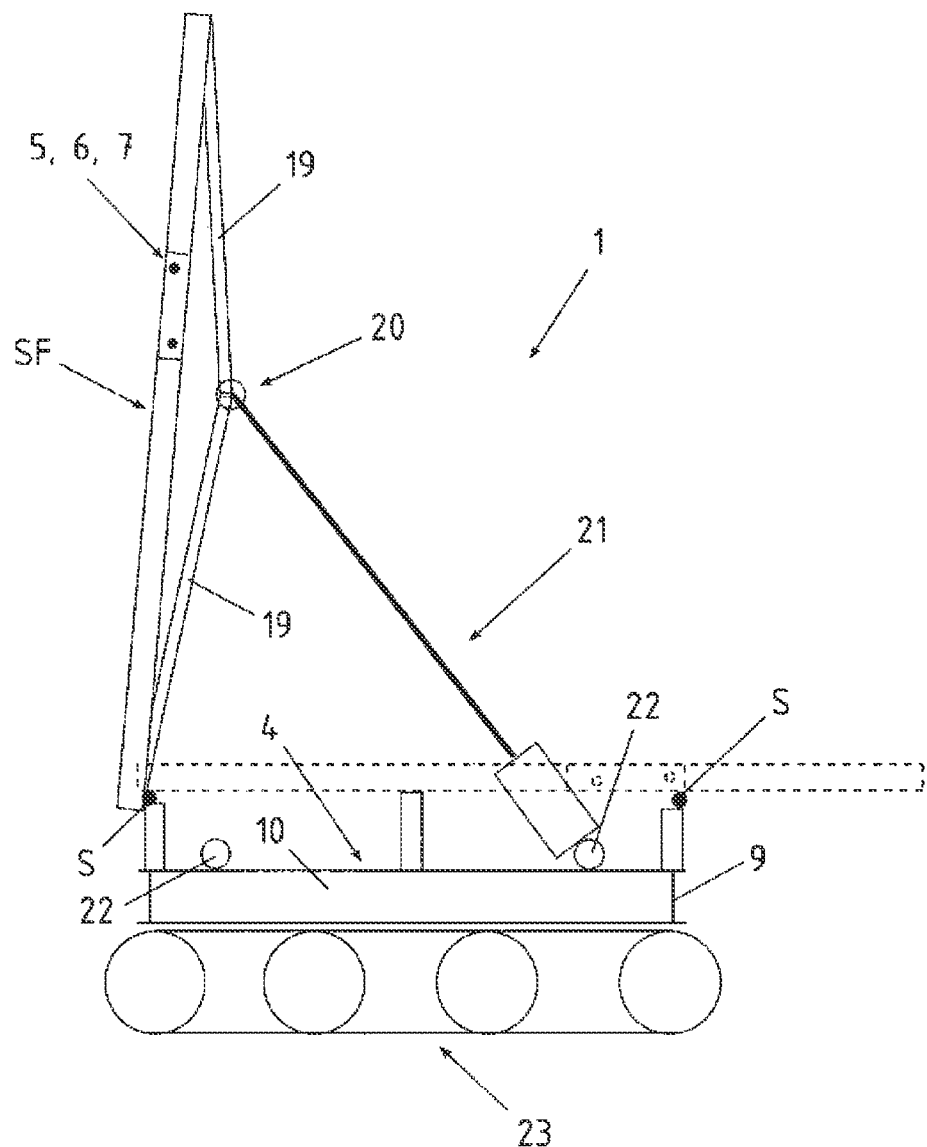
FIG. 7 the formwork table of FIG. 6 in a variant in the same representation.

FIG. 7 shows an alternative configuration of a manufacturing system 1. In order to allow mobility of the respective formwork table 5, 6, 7 as autonomous as possible, the supporting structure 4 has a chassis 23. Presently, the chassis 23 is formed as a crawler-type chassis. The supporting structure 4 is movable together with at least one of the formwork tables 5, 6, 7 on suitable ground not illustrated in more detail via the chassis 23.

FIG. 8 shows an alternative configuration of the supporting structure 4. In the schematic illustration, longitudinal supports 9*a* extending parallel to each other are apparent, which are segmentally pushed into each other.

FIG. 9 illustrates in a section A-A the arrangement of the longitudinal supports 9*a* disposed in each other. The longitudinal supports 9*a* are C profiles. The longitudinal supports 9*a* disposed in each other have different cross-sectional sizes, whereby several, presently three longitudinal supports 9*a* are inserted into each other. At the ends of their legs, the longitudinal supports 9*a* have webs 24 perpendicular to them as well as facing each other such that the respectively outer longitudinal support 9*a* embraces the longitudinal support 9*a* respectively disposed therein on three sides, while the fourth side is encompassed by the webs 24 in certain areas. The webs 24 are dimensioned such that their overlying ends align with each other.

With regard back to FIG. 8, diagonally extending struts 25 are disposed besides the transverse supports 10 connecting the longitudinal supports 9*a*. The struts 25 cross a section of the supporting structure 4 presently pushed together in itself. The advantage is in that a possible displaceability of the frame respectively formed by the longitudinal supports 9*a* and the transverse supports 10 is effectively prevented by the struts 25.

In the present arrangement, the supporting structure 4 pushed together to a third of its overall length extending in the direction of the longitudinal supports 9*a* can support a formwork table 5, 6, 7 not illustrated in more detail here by supporting it. The part of the supporting structure 4 depicted in FIG. 8 is the fixed section Z1 thereof.

Moreover, the supporting structure 4 has further struts 25*a*, which form a considerably smaller angle between themselves in the presently pushed together state of the supporting structure 4 than the struts 25 crossing the present section of the supporting structure 4. The struts 25*a* are movably coupled to the individual longitudinal supports 9*a* in a manner not illustrated in more detail. Therein, each of the struts 25*a* extends between the end regions of two longitudinal supports 9*a* extending parallel to each other, wherein the end regions face in different directions. Therein, the respective strut 25*a* is coupled to an end region of a longitudinal support with one of its ends, while the other end of the strut 25*a* is coupled to a longitudinal support 9*a* extending parallel thereto, but which is associated with an adjacent section of the supporting structure 4.

For example, in order to enlarge the supporting structure 4 to its full length, the longitudinal supports 9*a* disposed in each other are segmentally pulled apart in an expansion direction x of the supporting structure 4.

FIG. 10 shows the supporting structure 4 of FIG. 8 expanded to its full length. Hereby, the supporting structure 4 has besides its fixed section Z1 variable sections Z2, Z3 adjoining thereto, which also serve for receiving as well as supporting formwork tables 5, 6, 7 not illustrated in more detail.

As is apparent, the struts 25*a* experience a length variation during the expansion of the supporting structure 4 in the expansion direction x thereof. It results from a removal of anchor points 26 disposed on the respective longitudinal supports 9*a*, between which the struts 25*a* diagonally extend, which arises upon pulling apart the longitudinal supports 9*a*. The struts 25*a* are fixed to the anchor points 26 with their ends.

The struts 25*a* are formed such that they allow length variation. To this, each of the struts 25*a* has a strut body 27, in which long elements 28 are each disposed towards both of its ends. The long elements 28 align with the respective strut body 27. In another embodiment, each of the struts 25*a* can also have only one strut body 27 with an individual long element 28.

The long elements 28 can be guided in the strut bodies 27 in that the strut bodies 27 are formed hollow, for example as a round tube or as a tube angular in cross-section. Of course, the long elements 28 can also be correspondingly hollow formed and thus receive the strut body 27 in them.

The connection between strut body 27 and long elements 28 is formed such that tensile forces can be transmitted between them. According to requirement, the strut bodies 27 as well long elements 28 can also be formed such that compressive forces can be transmitted between them. The coupling between the strut bodies 27 as well as long elements 28 is both detachable and lockable. Hereby, the longitudinal supports 9*a* can be pulled apart without problem if the coupling of the strut bodies 27 to the long elements 28 is detached. As soon as the longitudinal supports 9*a* are pulled apart to the required dimensions of the supporting structure 4, the coupling between the strut bodies 27 and the long elements 28 is locked such that stable crossing of the variable sections Z2, Z3 is effected.

By the previously illustrated configuration of the struts 25*a*, the supporting structure 4 can also have more than the three sections Z1, Z2, Z3 illustrated here. The arrangement of the struts 25*a* contractible in themselves as well as extendable in combination with the telescoping longitudinal supports 9*a* offers an extremely simple possibility of expanding the supporting structure 4 to the required length within shortest time without detachment or arrangement of individual components being needed to this. According to configuration of the locking between the strut bodies 27 and the long elements 28, the supporting structure 4 is additionally steplessly expandable such that a high degree of flexibility is achieved.

Despite of the extremely simple handling, hereby, an extremely safe system for the construction of a manufacturing system 1 according to the invention is provided, which offers an effectively reinforced supporting structure 4 adaptable to the local requirements with only few hand movements.

FIG. 11 shows the supporting structure 4 of FIG. 8 pushed together in a further variant. As is apparent, presently, it has a pivot bearing 29 in its fixed section Z1. The pivot bearing 29 is disposed on the transverse support 10.

Of course, the pivot bearing can also be disposed on at least one of the formwork tables 5, 6, 7 not illustrated in more detail here. By the pivot bearing 29, at least one of the formwork tables 5, 6, 7 not illustrated in more detail here is rotatable around a rotational axis (z) extending perpendicularly to its formwork area (SF) (see also FIG. 12).

FIG. 12 shows the supporting structure 4 pulled apart in expansion direction x in a side view. In this representation, each of the formwork tables 5, 6, 7 has a pivot bearing 29. Furthermore, the center formwork table 6 is pivoted from its horizontal position, more precisely erected.

Pulling apart the supporting structure 4 in expansion direction x can be effected both manually and by motor. Thus, for example, a type of hoist can be disposed within or outside of the longitudinal supports 9*a* such that by pulling via a pulling means, a corresponding extension or contraction of the supporting structure 4 can be effected. Furthermore, drives in the form of lifting cylinders, rack or rotary spindle drives are also conceivable. Preferably, the longitudinal supports 4 are guided into each other such that they only have a low backlash, which is required for shifting the longitudinal supports 9a into each other without stress.

The stepping of the upper progression of the supporting structure 4 resulting from the longitudinal supports 9a differing from each other in cross-section, can be compensated for by compensating elements not illustrated in more detail. These compensating elements can for example be disposed between the longitudinal supports or the transverse supports and the respective formwork tables 5, 6, 7 as well as their substructure.

Basically, leveling elements not illustrated in more detail can be disposed between the formwork tables 5, 6, 7 and the supporting structure 4. The leveling elements can for example be screw elements, by rotation of which alignment of the formwork tables 5, 6, 7 in height with respect to the supporting structure 4, in particular the respective ground is possible.

Figure 13:
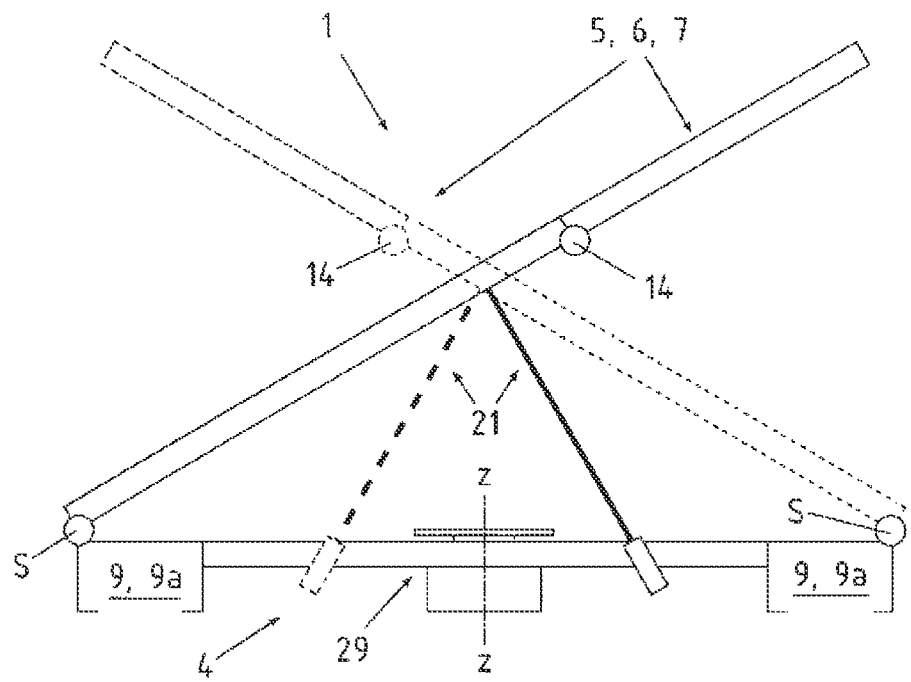

FIG. 13 shows the possible directions of pivoting the formwork tables 5, 6, 7 of the manufacturing system 1 in an illustration. As is apparent, the formwork tables 5, 6, 7 can be inclined via the swivel bearings S disposed on the two longitudinal sides of the supporting structure 4, whereby the respective erection direction of the formwork tables 5, 6, 7 can be changed. Upon inclining the formwork tables 5, 6, 7, the effect of the hinge 14 is cancelled, for example via suitable locking. According to inclination direction, the linear drive 21 is correspondingly relocated in order to allow erecting the formwork tables 5, 6, 7 into the desired direction.

Figure 14:
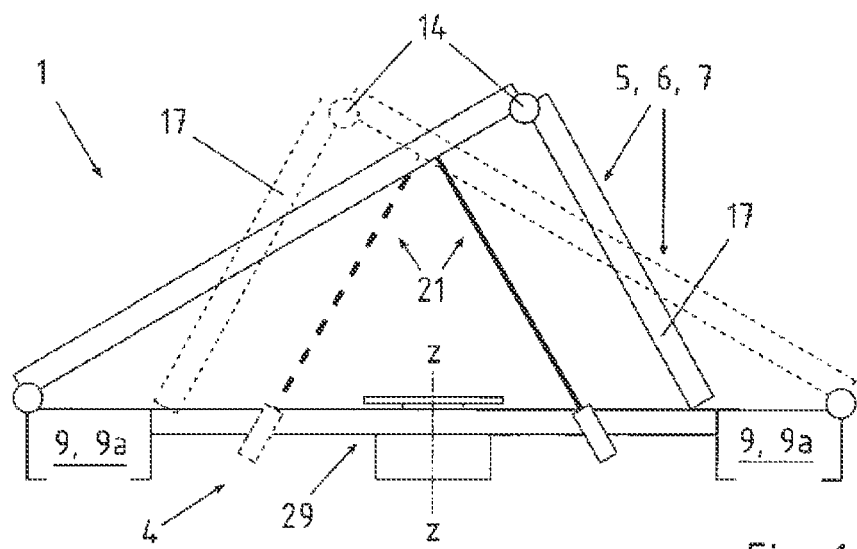
FIG. 14 the manufacturing system of FIG. 13 in the transport condition.

FIG. 14 shows the state of the manufacturing system 1 for the displacement thereof into the cargo container 2 not illustrated in more detail here. To this, the formwork tables 5, 6, 7 are inclined as far as the modules 17 connected to the formwork tables 5, 6, 7 via the hinges 14 can be folded. It is the objective to reduce the width of the formwork tables 5, 6, 7 reached via the modules 17 as much as the entire manufacturing system 1 maximally corresponds to the clear width of the internal space of the cargo container 2. In this manner, the manufacturing system 1 having a considerably larger formwork area SF can be reduced to a compact size by corresponding displacement of the formwork tables 5, 6, 7 and the modules 17 in order to be transported within the cargo container 2.

REFERENCE CHARACTERS

1—manufacturing system
2—cargo container
3—rails
4—supporting structure
5—formwork table
6—formwork table
7—formwork table
8—rollers
9—longitudinal support
10—transverse support
11—legs
12—longitudinal profile
13—transverse profile
14—hinge
15—rail profile
16—yokes
17—modules
18—screws
19—cross-profile
20—junction
21—linear drive
22—receptacle
23—chassis
24—web
25—strut
25a—strut
26—anchor point
27—strut body
28—long element
29—pivot bearing
A—horizontal axis
F—hoist
W—angle
S—swivel bearing
SF—formwork area
x—expansion direction
Z1—section, fixed
Z2—section, variable
Z3—section, variable
z—rotational axis

The invention claimed is:

1. A method of producing prefabricated parts of mineral-bound building materials by means of a manufacturing system, wherein the manufacturing system includes a cargo container, a supporting structure, and at least one formwork table,
wherein the cargo container is a 20 feet container or a 40 feet container,
wherein the at least one formwork table is provided for casting the prefabricated parts of mineral-bound building materials and is supported on the supporting structure,
wherein the supporting structure is transportable to the site of use with the at least one formwork table in the cargo container,
wherein the supporting structure is displaceable along a longitudinal extent out of the cargo container on the site of use together with the at least one formwork table,
wherein the supporting structure has rollers and is movable along the longitudinal extent on first rails located on the floor of the cargo container so that the displacement is effected on a rail-bound system, and
wherein the supporting structure has longitudinal supports which are translationally mutually displaceable at least in sections both for longitudinally extending and contracting the supporting structure along the longitudinal supports.

2. The method of claim 1, characterized in that the manufacturing system overall fits in the cargo container transported to the site of use of the prefabricated parts by means of a truck.

3. The method of claim 1, characterized in that several formwork tables are provided, which are displaceable independently of each other.

4. The method of claim 3, characterized in that the formwork tables are supported on the supporting structure, which is displaced on the rails together with the several formwork tables out of the cargo container upon use and into it upon non-use.

5. A manufacturing system for producing prefabricated parts of mineral-bound building materials at a site of use, wherein the manufacturing system includes a cargo container, a supporting structure, and at least one formwork table,
wherein the cargo container is a 20 feet container or a 40 feet container, wherein the at least one formwork table is provided for casting the prefabricated parts of mineral-bound building materials and is supported on the supporting structure, wherein the supporting structure is transportable to the site of use of the prefabricated parts together with the at least one formwork table in the cargo container, wherein the supporting structure is displaceable along a longitudinal extent out of the cargo container on the site of use together with the at least one formwork table, wherein the supporting structure has rollers and is movable along the longitudinal extent on first rails located on the floor of the cargo container so that the displacement is effected on a rail-bound system, and wherein the supporting structure has longitudinal supports which are translationally mutually displaceable at least in sections both for longitudinally extending and contracting the supporting structure along the longitudinal supports.

6. The manufacturing system according to claim 5, characterized in that the supporting structure is further movable along the longitudinal extent on second rails located on the ground of the site of use, and that the second rails are carryable along with the cargo container.

7. The manufacturing system according to claim 5, characterized in that the supporting structure has a chassis, via which the supporting structure is movable together with the at least one formwork table.

8. The manufacturing system according to claim 5, characterized in that the supporting structure includes individual struts crossing the longitudinal supports of the supporting structure, wherein at least some of the struts are contractible in themselves and/or extendible.

9. The manufacturing system according to claim 5, characterized in that the at least one formwork table has hinges and is unfoldable to a width, which is larger than the width of the cargo container.

10. The manufacturing system according to claim 5, characterized in that the at least one formwork table has receptacles for external modules, via which the at least one formwork table is enlargeable to a width, which is larger than the width of the cargo container.

11. The manufacturing system according to claim 5, characterized in that the at least one formwork table is pivoted on the supporting structure.

12. The manufacturing system according to claim 5, characterized in that the supporting structure includes swivel bearings, via which the at least one formwork table is supported on the supporting structure, wherein the swivel bearings are formed and disposed such that the at least one formwork table is inclinable by an inclination angle in mutually different directions around at least two horizontal axes extending parallel to each other.

13. The manufacturing system according to claim 5, characterized in that the at least one formwork table includes a pivot bearing such that the at least one formwork table is rotatable around a rotational axis extending perpendicularly to its formwork area.

14. The manufacturing system according to claim 5, characterized in that the at least one formwork table includes both longitudinal profiles and transverse profiles as well as cross-profiles extending obliquely to them, which are connected to each other in a common junction.

15. The manufacturing system according to claim 14, characterized in that the cross-profiles each form an angle between themselves and the formwork area of the at least one formwork table, which opens towards the junction.

16. The manufacturing system according to claim 14, characterized in that a linear drive for pivoting the at least one formwork table is disposed between the supporting structure and the respective junction of the at least one formwork table.

17. The manufacturing system according to claim 16, characterized in that the linear drive is detachably coupled to the respective junction of the at least one formwork table and the supporting structure.

18. The manufacturing system according to claim 5, characterized in that the at least one formwork table comprises several formwork tables are disposed on the common supporting structure.

19. The manufacturing system according to claim 18, characterized in that the several formwork tables are immediately adjacent for forming a common formwork area.

* * * * *

UNITED STATES PATENT AND TRADEMARK OFFICE
CERTIFICATE OF CORRECTION

PATENT NO. : 9,895,827 B2
APPLICATION NO. : 14/038326
DATED : February 20, 2018
INVENTOR(S) : Christoph Maier It is certified that error appears in the above-identified patent and that said Letters Patent is hereby corrected as shown below:

In the Claims

At Column 14, Claim number 4, Line numbers 56-57:
"The method of claim 3, characterized in that the formwork tables"
Should be changed to:
-- The method of claim 3, characterized in that the several formwork tables --

Signed and Sealed this
Thirtieth Day of October, 2018

Andrei Iancu
*Director of the United States Patent and Trademark Office*